United States Patent [19]
Amarant et al.

[11] Patent Number: 5,450,477
[45] Date of Patent: Sep. 12, 1995

[54] MONITORING OF CHARGES DEBITED TO AN ACCOUNT HAVING AN ASSIGNED LIMIT

[75] Inventors: Brenda B. Amarant, South Orange, N.J.; William H. Desmedt, Milford, Pa.; David C. McChristian, Naperville, Ill.; Robert M. Neilon, Pickerington, Ohio

[73] Assignee: AT&T Corp., Murray Hill, N.J.

[21] Appl. No.: 174,167

[22] Filed: Dec. 27, 1993

Related U.S. Application Data

[63] Continuation of Ser. No. 786,191, Oct. 31, 1991, abandoned.

[51] Int. Cl.⁶ ............................................. H04M 11/00
[52] U.S. Cl. ........................................ 379/93; 379/91; 379/144
[58] Field of Search ...................... 379/91, 93; 348/1

[56] References Cited

U.S. PATENT DOCUMENTS

| | | | |
|---|---|---|---|
| 3,723,655 | 3/1973 | Zucker et al. | 379/91 |
| 3,896,266 | 7/1975 | Waterbury | 379/91 |
| 4,577,061 | 3/1986 | Katzeff et al. | 379/91 |
| 4,706,275 | 11/1987 | Kamil | 379/144 |
| 4,731,818 | 3/1988 | Clark, Jr. et al. | 379/91 |
| 4,746,786 | 5/1988 | Heberle et al. | 379/91 |
| 4,750,201 | 6/1988 | Hodgson et al. | 379/91 |
| 4,756,020 | 7/1988 | Fodale | 379/91 |
| 4,757,186 | 7/1988 | Heberle et al. | 379/144 |
| 4,879,744 | 11/1989 | Tasaki et al. | 379/91 |
| 5,068,891 | 11/1991 | Marshall | 379/91 |
| 5,138,650 | 8/1992 | Stahl et al. | 379/91 |
| 5,163,086 | 11/1992 | Ahearn et al. | 379/91 |
| 5,223,699 | 6/1993 | Flynn et al. | 379/91 |

*Primary Examiner*—Brent Swarthout
*Assistant Examiner*—Daniel J. Wu
*Attorney, Agent, or Firm*—Eugene J. Rosenthal; Eli Weiss

[57] ABSTRACT

Charges and balances assignable to a credit card account are controlled and monitored by assigning a purchase limit to the card. More specifically, when a card is used to pay for a telephone call on a telecommunication network, the validity of the card is verified in, for example, a network database and the card record is examined for the presence of a purchase limit. If the card has a purchase limit, the network database determines the type of purchase limit which applies and if the balance is positive. If the balance is not positive and the purchase limit applicable does not authorize the extension of credit, a denial response is sent from the network database to an appropriate local operator system which provides a denial indication to the caller. If the available balance is positive, the network database forwards the balance to the operator system. Based upon the balance returned in the reply from the database, the operator system sends a request to a rating processor to determine the length of time the caller may talk. If the rating database cannot ascertain the amount of time a caller can speak, for whatever reason, the call is denied. Thus, the balance is used to determine how long the caller can speak. At various predetermined intervals during the call and immediately after the call has been completed, the actual charges are calculated and forwarded to the network database. If during a call, the maximum duration is exhausted, the operator system will terminate the call, calculate the actual charges, and forward the charges to the network database. The network database decrements the balance with each intermediate update from the operator system. At the termination of a call, the network database adjusts the card holders balance a final time to maintain the purchase balance accuracy.

3 Claims, 4 Drawing Sheets

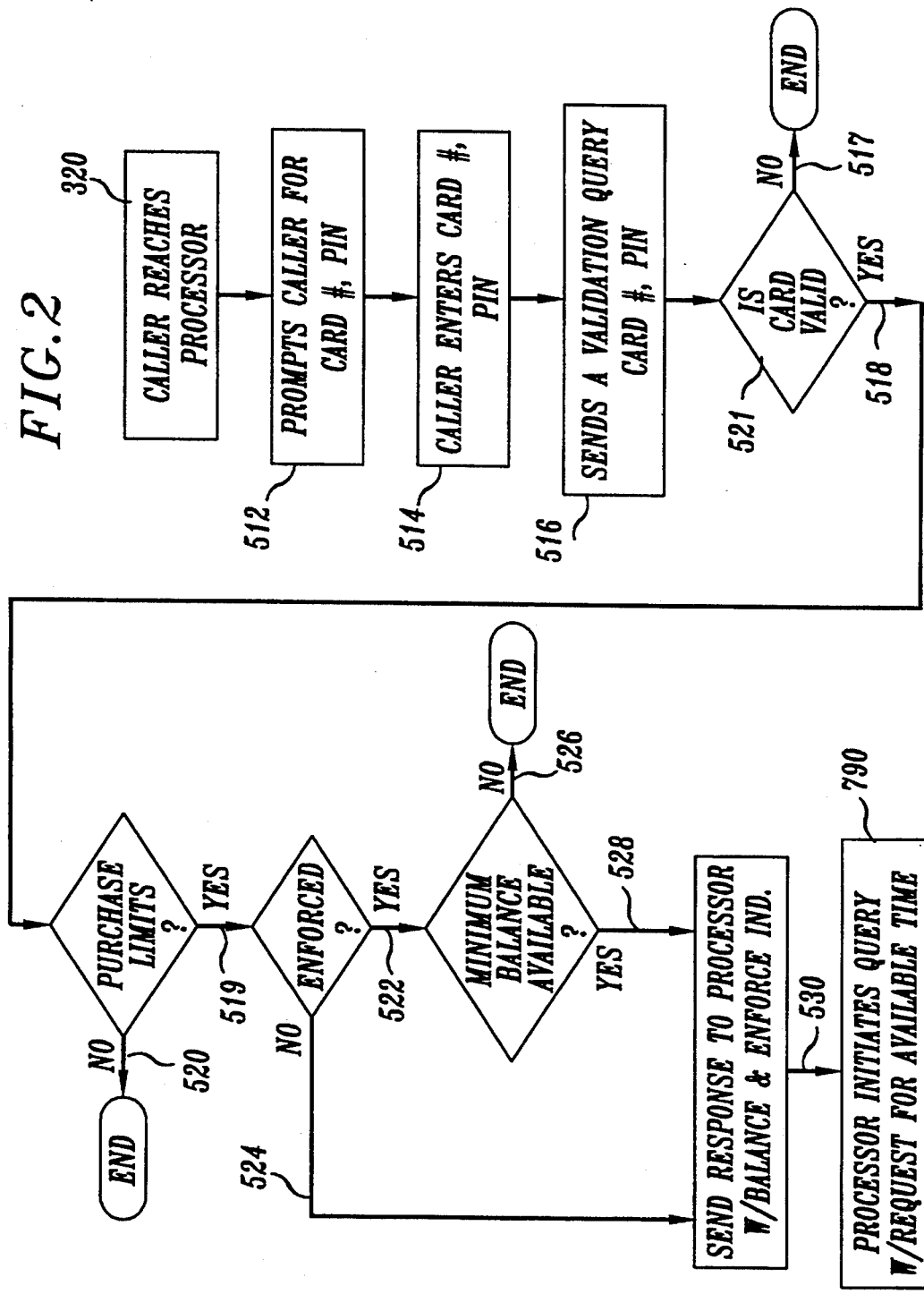

MONITORING OF CHARGES DEBITED TO AN ACCOUNT HAVING AN ASSIGNED LIMIT

This application is a continuation of application Ser. No. 07/786,191, filed on Oct. 31, 1991, now abandoned.

TECHNICAL FIELD

This invention relates generally to a method of monitoring billing charges assigned to an account such as a credit card account.

DESCRIPTION OF THE PRIOR ART

The use of credit cards to purchase items and services has increased substantially in recent years. Normally, when a credit card is used to make a purchase, a record of the transaction is made and the card holder is subsequently billed. Alternatively, the card holder deposits money into an account, and this account is used to provide payment for the item or service billed. The credit card used in this second case is normally referred to as a "debit card".

The telecommunication industry permits telephone users to use credit cards or debit cards to pay for various telecommunications services. In some situations, for example, where a call originates from a pay telephone, the use of a credit card or a debit card can be the preferred method of paying for the call.

Business customers have found it desirable: to provide employees with cards for charging telephone calls made during business trips or when they are otherwise away from their offices. However, business customers are interested in not only controlling telephone use of a card, but they would also like to restrict the amount of charges their employees accrue, when making telephone calls. Residential customers have the same need, i.e., that of being able to limit and/or monitor the amount of charges that are being incurred on their calling cards.

Presently, a certain amount of control of the use of credit is obtained with a debit card. Normally, debit cards have a prespecified amount of "credit" associated with each card, and this credit is embedded within the technology that is both specific to the card and the telephone. When a debit card is used, the telephone must be equipped with a special technology capable of reading the balance amount associated with the credit card and of decreasing this amount, on the card itself, when the customer completes the telephone call. When the balance for the card is reduced to zero, the card is discarded. If additional calls are to be made, a new card having a new assigned value must be obtained.

Although the debit type of credit card allows customers to exercise some control over telecommunications charges, this control can only be obtained through the use of special equipment. Clearly, a method of providing both business and residential customers with a more flexible and economical way of controlling and monitoring their credit card costs is needed.

SUMMARY OF THE INVENTION

A more flexible and improved method of controlling and monitoring charges and balances assignable to a credit card account is obtained by assigning a purchase limit to the card.

More specifically, when a card is used to pay for a call on a telecommunication network, the validity of the card is verified in, for example, a network database and the card record is examined for the presence of a purchase limit. If the card has a purchase limit, the network database determines the type of purchase limit which applies and if the balance is positive. If the balance is not positive and the purchase limit applicable does not authorize the extension of credit, a denial response is sent from the network database to an appropriate local operator system which provides a denial indication to the caller. If the available balance is positive, the network database forwards the balance to the operator system.

Based upon the balance returned in the reply from the database, the operator system sends a request to a rating processor to determine the length of time the caller may talk. If the rating database cannot ascertain the amount of time a caller can speak, for whatever reason, the call is denied. Thus, when a positive balance exists the balance is used to determine how long the caller can speak.

At various predetermined intervals during the call and immediately after the call has been completed, the actual charges are calculated and forwarded to the network database. If during a call, the maximum duration is exhausted, the operator system will terminate the call, calculate the actual charges, and forward the charges to the network database. The network database decrements the balance with each intermediate update from the operator system. At the termination of a call, the network database adjusts the card holders balance a final time to maintain the purchase balance accuracy.

BRIEF DESCRIPTION OF THE DRAWING

FIG. 1 illustrates the relationship of FIGS. 2, 3, 4 and 5; and

FIGS. 2, 3, 4 and 5 illustrate a flow diagram of the operation performed by the telecommunication network elements for controlling and monitoring charges and balances assignable to a credit card in accordance with the principles of the invention.

DETAILED DESCRIPTION

Figure 3:
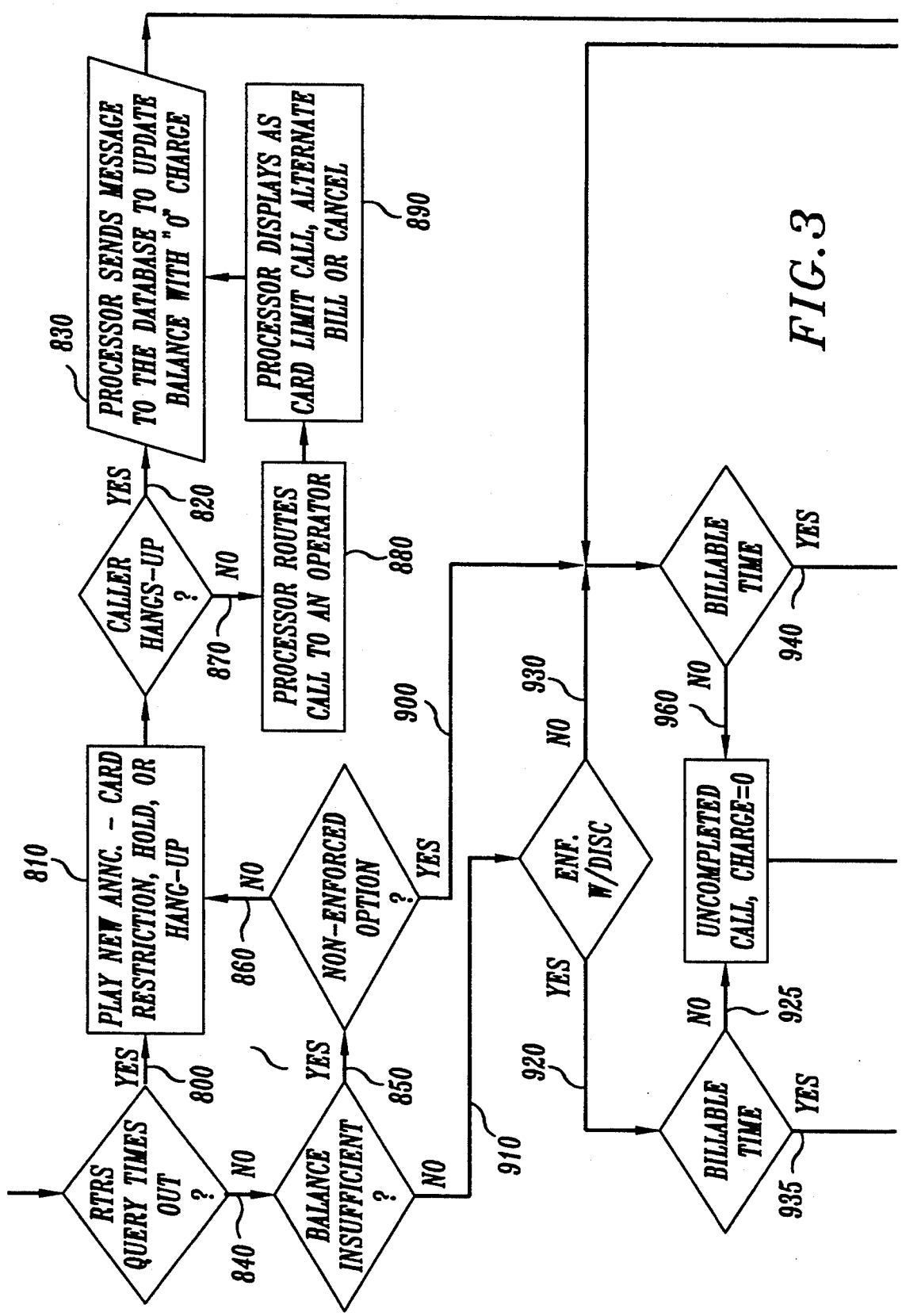
Figure 4:
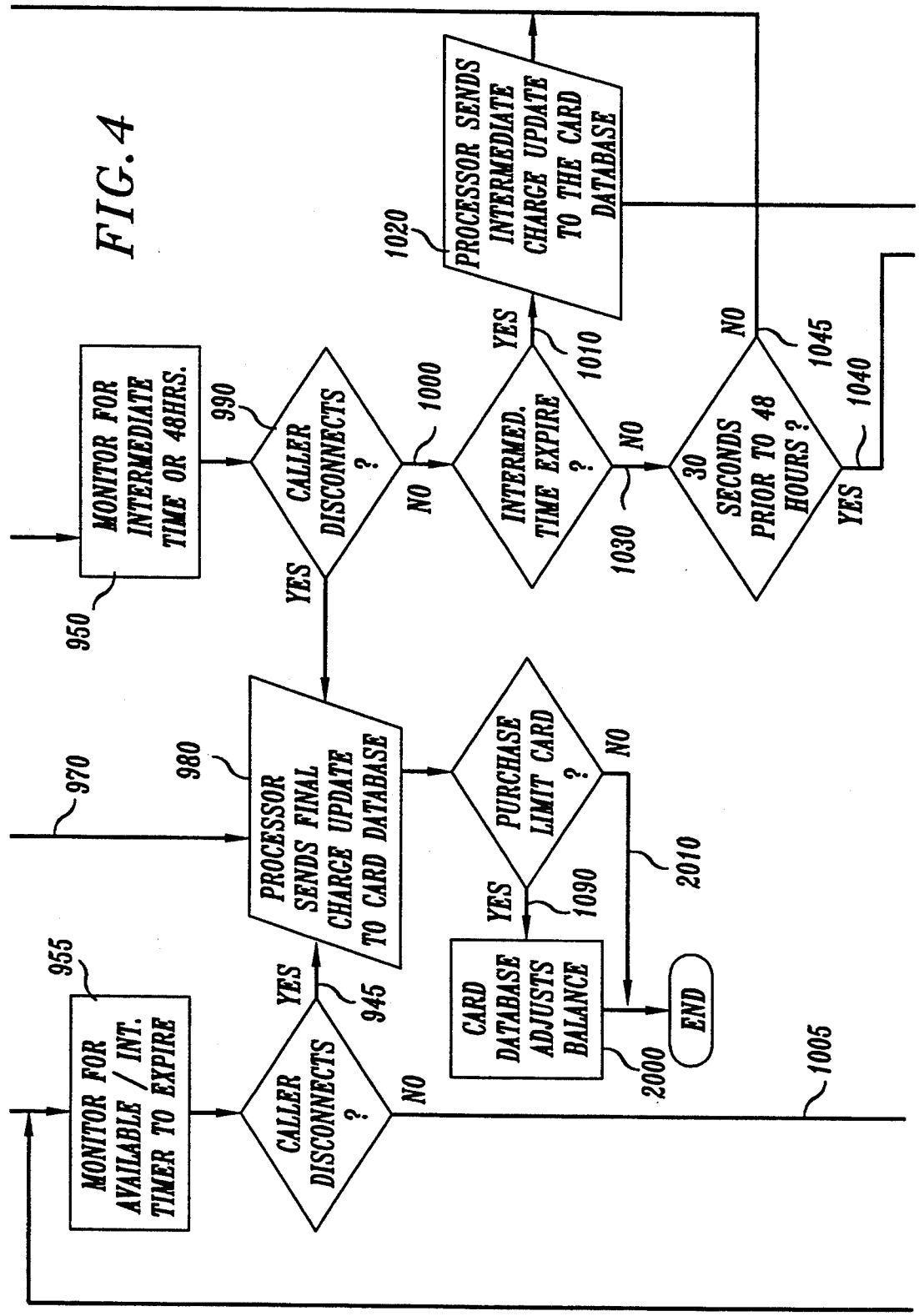
Figure 5:
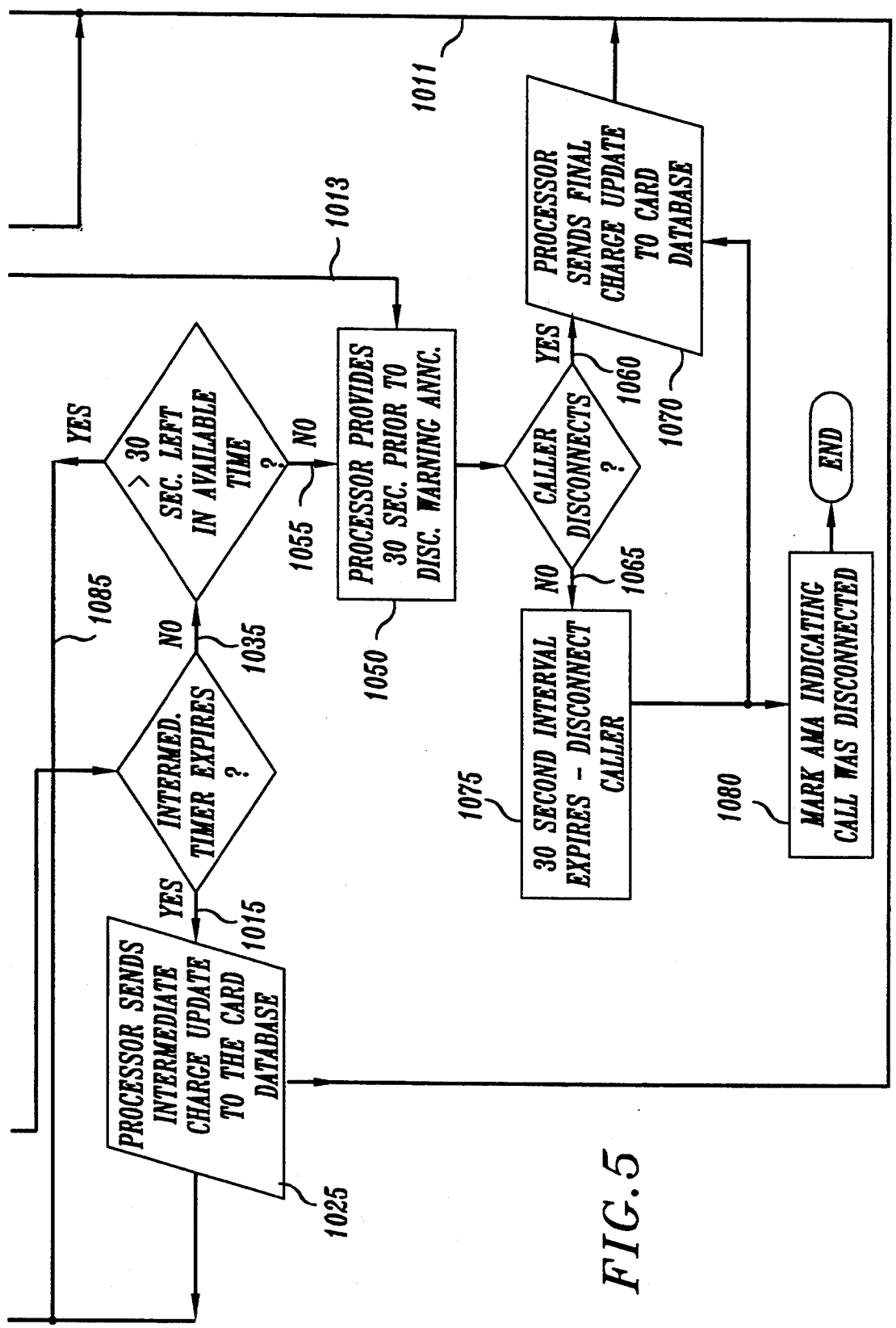

In this invention, a purchase limit is assigned to each credit card. The purchase limit prevents additional charges from being assigned to a credit card when the total current charges made against the card exceed the maximum limit specified by the card holder. In some instances, a card holder may specify that the use of the credit card is not limited by the purchase limit balance. This is usually referred to as a "non-enforced limit". In this situation, a charge intended for that card will not be denied when the assigned purchase limit is exceeded. However, all other charge processing procedures associated with the "do not enforce limit" remain consistent with the enforced purchase limit.

To help insure the accuracy of the balance, a customer who has multiple users of a single card account, such as is the case when a credit card is used to pay for telephone calls, the holders of the card may be restricted to having one call in progress at any given time. In this mode of operation multiple users of a single card are unable to use their card concurrently when placing calls over a telephone network. However, users of a single card are able to use their card concurrently for those calls which do not affect the purchase balance, i.e., a non-purchase balance affecting call. A non-purchase balance affecting call can be defined as any call for which the purchase limit feature is not applied and, therefore, the purchase balance is not altered.

Initially, a credit card holder subscribes by applying for and being assigned a purchase limit value. This value which is assigned to the credit card is entered into the network. In the embodiment here disclosed, the maximum limit a subscriber may have assigned to a card is set at $9,999.99. It is to be understood, however, that this value is arbitrary. The card holder also elects whether the purchase limit should be enforced or not enforced. Specifically, a card holder may subscribe to any one of three individual purchase limit options. The enforced-with-disconnect option allows the card subscriber to use a card until the balance has been depleted. If the balance is depleted during a call, the call will be disconnected and future calls will be denied until the balance is replenished. The enforced-without-disconnect option allows the card subscriber to use a card as long as the balance is sufficient to pay for the call. Unlike enforced-with-disconnect, once a call is established it will not be terminated. However, all future calls will be denied until the balance is replenished. The non-enforced option acts more as a record keeping tool or auditing function that accumulates the expense charged against the card. Thus, calls are never prohibited from being established and are never disconnected due to a balance being exhausted. All card holders who, elect to subscribe to a purchase limit option here disclosed are notified when their purchase limit balance has been depleted.

When a credit card call is originated, the operator system i.e., the local telephone company connected to the telephone which originates the call, sends a query to a network database to validate the credit card. The network database validates the credit card for billing purposes, and also checks the credit card record to see if the card has a purchase limit associated with it. If the card has a purchase limit, the network database will determine if the available balance is positive. If the available balance is not positive and the card holder has requested that all credit card calls be denied under these circumstances (enforced with or without disconnect), a denial response is sent to the operator system. If the available balance is positive, then the network database forwards the balance to an operator system. The operator system sends a request to a rating processor to determine the maximum duration the purchase limit balance received from the network database can support. The call attempt will be denied if the rating processor cannot provide this information or the balance is insufficient to purchase a minimum amount of call duration, typically referred to as the initial period. Based upon the identified purchase limit option and the duration returned from the rating processor, the operator system will determine the maximum length of time the caller may talk, not to exceed 48 hours.

If the call attempt is disallowed due to a rating processor rejection or the call results in an uncompleted attempt, the network database is informed and the transaction for the specific card is closed. Otherwise, at intermediate intervals and when the call completes, whichever occurs first, the operator system requests a charge from the rating processor and calculates the actual charge and forwards the charge to the network database. If the call reaches the maximum duration and the customer has chosen the enforced with disconnect option, the operator system will terminate the call, calculate the actual charge, and forward the charge to the network database. Upon receipt of a call charge update from the operator system, the network database then adjusts the customer's balance by decrementing the balance by the charge amount supplied by the operator system.

When a card holder subscribes to a specific type of credit card service, the subscriber receives an embossed plastic card and instructions on how to use the card. For telecommunication applications, the card holder desiring a purchase limit option will interact with the telecommunication carrier which will translate the card holders request into the necessary format required by the network database. The value of the purchase limit and the options elected by a customer and assigned to a card are entered and stored in a database hereafter more specifically referred to as the card database. To attempt a call, the purchase limit subscriber will access the telecommunications network in the same manner as a non-purchase limit card holder. Attempts are differentiated once a database validation request is received by the card database. Referring to FIG. 2, when a telephone is "picked-up" and a 0+call is entered via a telephone key pad, the caller reaches a processor, at 320 which can be part of the local telephone company which then prompts the caller for the card number and personal identification number (PIN), at 512. In response to this request, the caller enters the card number and personal identification number, at 514. Upon receipt of this information, the operator system sends a validation query signal, at 516 along with the card number and PIN to a card database, at 521 which contains the card account numbers and other parameters used to authorize the transaction.

If, for some reason, the information about l:he card is not valid, the card database will transmit a signal 517 which denies use of the credit card. If the card is valid, a signal 518 is generated indicating that the card account is to be checked for the presence of options. If the card is valid, the signal 2518 queries the card database to determine if the card holder subscribes to a purchase limit. If the card holder does not subscribe to a purchase limit, a signal 520 is generated and the call is processed without accessing the purchase limit feature. If the card holder does subscribe to a purchase limit option, signal 519 is generated. Signal 519 queries the card database to determine if the card holder subscribes to an enforced-with-disconnect or enforced-without-disconnect option. Signal 524 is generated if the card holder does not subscribe to either type of enforced option, otherwise signal 522 is generated and a positive balance check is performed. For a card holder who subscribes to an enforced option, a denial signal 526 will be generated by the card database if the purchase limit balance has been depleted, otherwise the: card database will generate a signal 528.

If the card passes these validation checks, as evidenced by signal 524 or 528, the card database will send a signal 530 to the operator system which identifies the specific limit option and the transaction balance for the card holder.

Prior to actually attempting to complete the call, the operator system will generate a rating query 790 signal which will interrogate a rating processor to provide the available call duration based upon the transaction balance.

If the query times out as indicated by signal 800, the operator system will deny the call and transmit to the caller a card limit denial announcement 810.

If the caller hangs-up 820, the operator system will initiate an update 830 to the card database requesting that the transaction for the offered card be closed. If, however, the caller does not hang-up as evidenced by signal 870, the caller is queued for an operator 880. Upon connection to an operator position 890, the caller can either bill the call or terminate the call. The operator system will initiate an update to the card database, at 830 to close the transaction if either another billing method is chosen or the call is canceled.

If the rating query does not time out, indicated by signal 840 but the reply indicates that the transaction balance is not sufficient to pay for the call, signal 850, the operator system will ascertain if the card holder subscribes to a non-enforced option. If the card holder does not subscribe to the non-enforced option 860, a card limit denial announcement, indicated by 810 will be played to the caller.

If the card holder does subscribe to the non-enforced option indicated by signal 900, or the rating database indicates the transaction balance was adequate by signal 910 and the card subscribes to the non-enforced, or enforced-without-disconnect option by signal 930, the operator system will attempt to complete the call.

If billable timing occurs, signal 940, the operator system will start intermediate timing, at 950 to determine when an update should be sent to the card holder database. If billable timing does not occur, signal 960, the operator system will determine that no charge applies, signal 970. The operator system will then initiate a final update to the card database, at 980.

If, however, the caller disconnects as indicated by signal 990 before the intermediate time limit expires, the operator system will determine the final charge amount and initiates a final update 980 to the card database.

If the caller does not disconnect, signal 1000, and the intermediate time limit does expire, signal 1010, the operator system will determine the incremental charge amount to that point, at 1020, and initiates an intermediate update to the card database.

If, however, the intermediate timer has not expired, signal 1030, and the allowed time remaining on the call equals 30 seconds, signal 1040, the operator system will play a card limit disconnect warning announcement, generated at 1050, to the caller. Following the playing of the announcement, the operator system will monitor the call to determine if the caller disconnects.

If the caller disconnects, signal 1060, the operator system will determine the last incremental charge, at 1070, and send a final update to the card database. If the caller remains off-hook, signal 1065, following the card limit disconnect announcement and the last 30 seconds of the call expire, at 1075, the operator system will disconnect the callers, mark the automatic message accounting record, at 1080, with an indication that the call was disconnected due to a transaction balance expiring and the operator system will initiate a final update, at 1070, to the card database with the last incremental charge.

If it is not 30 seconds before disconnect, signal 1045, the operator system will continue to perform intermediate timing, at 950.

If the result from the rating database indicates the balance is sufficient, signal 910, and the card limit option is enforced-with-disconnect, signal 920, the operator system will attempt to complete the call. If billable timing does not occur, signal 925, the operator system will determine that no charge applies, signal 970. The operator system will then initiates a final update to the card database, at 980.

If billable timing occurs, signal 935, the operator system will begin intermediate timing or time for disconnect of the call whichever occurs first, at 955. If the caller disconnects after billable timing, signal 945, the operator system determines the charge and sends a final update message, at 980, to the card database.

If the caller does not disconnect, signal 1005, and the intermediate time limit expires, signal 1015, the operator system will determine the incremental charge, at 1025, and update the card database.

If the intermediate time limit does not expire, signal 1035, but there is only 30 seconds of allowed time remaining in the call, signal 1055, the operator system will play the card limit disconnect announcement, at 1050, to the caller. If more than 30 seconds remains, signal 1085, the operator system will continue timing the call, at 955.

When updates are made, the card database decrements the card balance, at 2000, by the incremental amount in the update message.

What has been described is merely illustrative of the application of the principles of the present invention. Other arrangements and methods can be implemented by those skilled in the art without departing from the spirit and scope of the present invention.

We claim:

1. A method for use with an operator system for monitoring charges assigned to an account for the making of a telephone call comprising the steps of
    (a) storing in a database a billing authorization code representative of a card account having an assigned purchase limit for a user authorized to make transactions;
    (b) determining, at the time the telephone call is initiated, the purchase amount limit assigned to said account, said determining step comprising
        communicating said code via a telephone network to said database, and
        comparing said code to the stored information in said database;
    (c) obtaining, at the time the telephone call is initiated, the current existing purchase balance remaining in the account, said current existing purchase balance comprising said purchase limit minus transactions against said account preceding said telephone call being initiated;
    (d) periodically transmitting a request, from said operator system for the actual cost of a period of said telephone call immediately preceding said request, to a rating processor separate from said database;
    (e) receiving at said operator system each actual cost from said rating processor for the immediately preceding period in response to said request; and
    (f) periodically transmitting said each actual cost to said database by said operator system, via said telephone network, for use in developing an updated current existing purchase balance by deducting each of said actual costs from said current purchase balance.

2. The method as defined in claim 1 further comprising the step of
    notifying the account user when the telephone call depletes the existing purchase balance.

3. The method as defined in claim 1 further comprising the step of
    terminating the telephone call when the telephone call depletes the existing purchase balance.

* * * * *